United States Patent [19]

Manzoni

[11] 4,357,076

[45] Nov. 2, 1982

[54] CONTROL DEVICE FOR VEHICLE REARVIEW MIRROR

[76] Inventor: Stéphane Manzoni, 1, rue Pasteur, Saint-Claude, France, 39200

[21] Appl. No.: 217,420

[22] Filed: Dec. 17, 1980

[30] Foreign Application Priority Data

Sep. 1, 1980 [FR] France .................................. 8000410

[51] Int. Cl.³ ............................ G02B 7/18; B60R 1/06
[52] U.S. Cl. ................................ 350/307; 248/475 B; 248/487
[58] Field of Search .................... 350/307; 248/475 B, 248/479, 487, 481; 74/491

[56] References Cited

U.S. PATENT DOCUMENTS

| 4,213,675 | 7/1980 | Pilhall | 350/307 |
| 4,218,037 | 8/1980 | Palamountain | 350/307 |
| 4,279,473 | 7/1981 | Yamana | 350/307 |

FOREIGN PATENT DOCUMENTS

| 2829492 | 1/1980 | Fed. Rep. of Germany | 350/307 |
| 2163109 | 7/1973 | France | 350/307 |
| 2320212 | 3/1977 | France | 350/307 |
| 2721004 | 11/1978 | France | 350/307 |
| 1578950 | 11/1980 | United Kingdom | 350/307 |

Primary Examiner—Jon W. Henry
Attorney, Agent, or Firm—Lewis H. Eslinger

[57] ABSTRACT

The invention relates to a control device for a vehicle rearview mirror, in which a mirror, mounted for pivoting inside a casing, is controllable from inside the vehicle. The casing is pivotally mounted on a support member integral with the bodywork of the vehicle, about a substantially vertical axis, the said support member comprising a pivoting bearing inside which is slidably and rotatably mounted a handle of which one end is provided with an operating lever, whereas the other end is connected via a connection with two orthogonal pivoting axles, to an arm of the mirror support.

8 Claims, 9 Drawing Figures

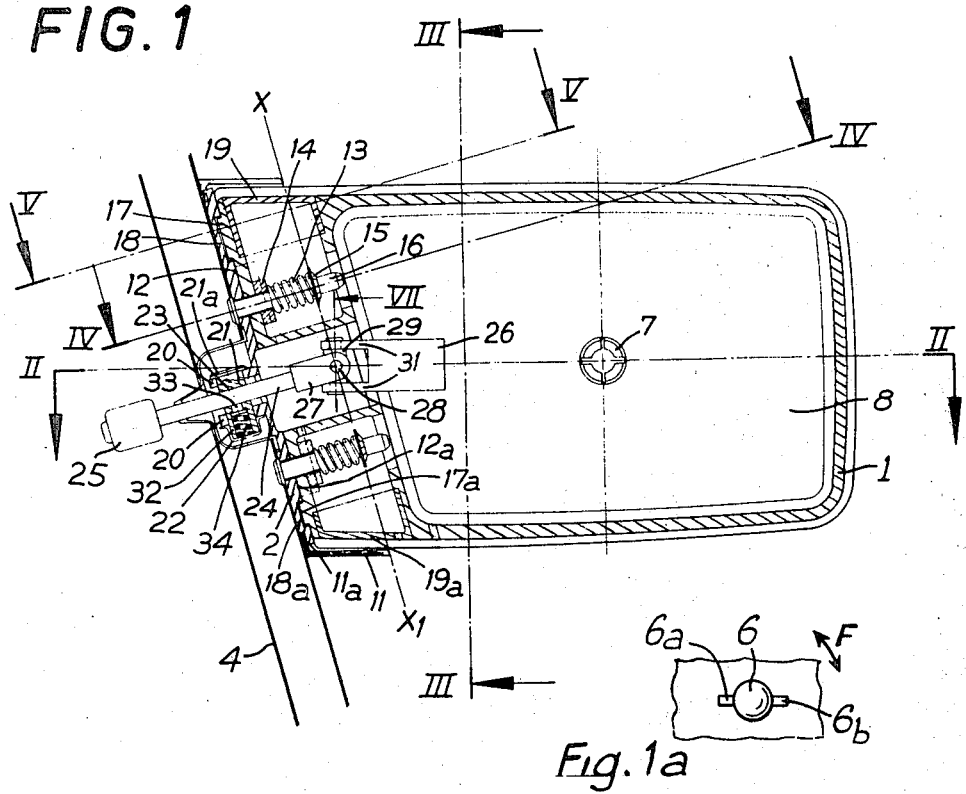
FIG.1
Fig.1a
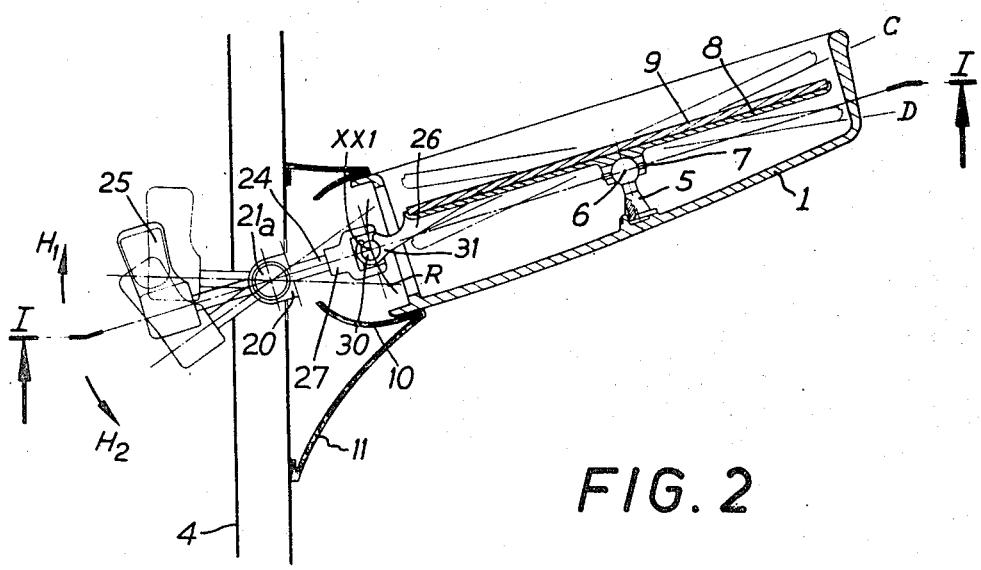
FIG.2

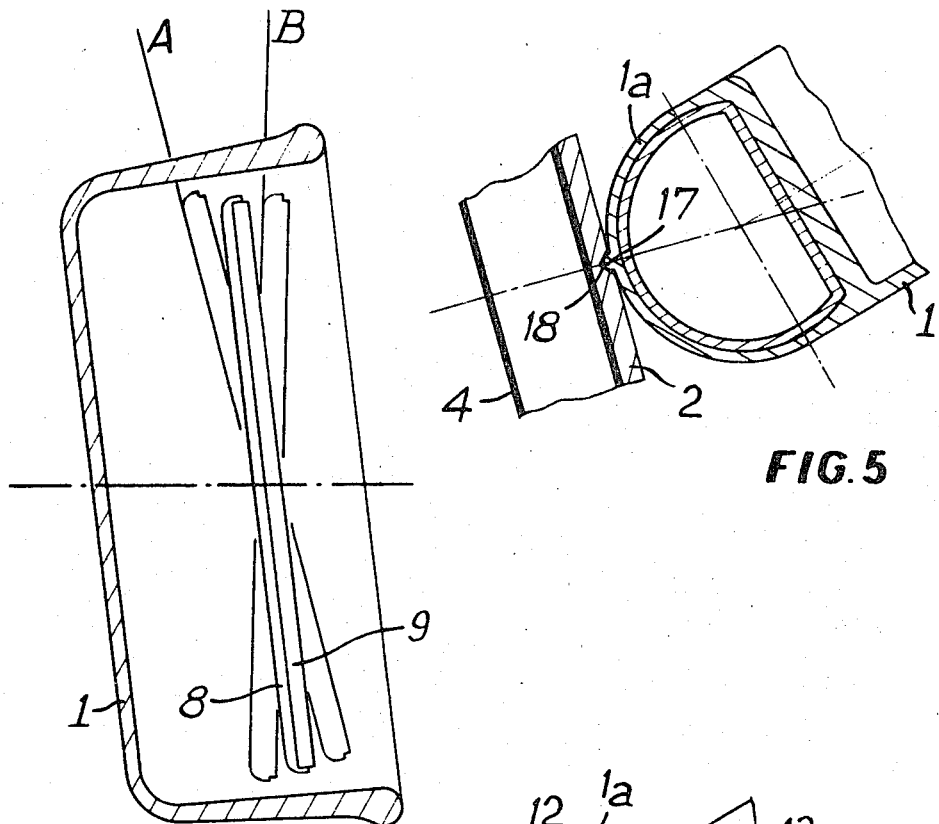
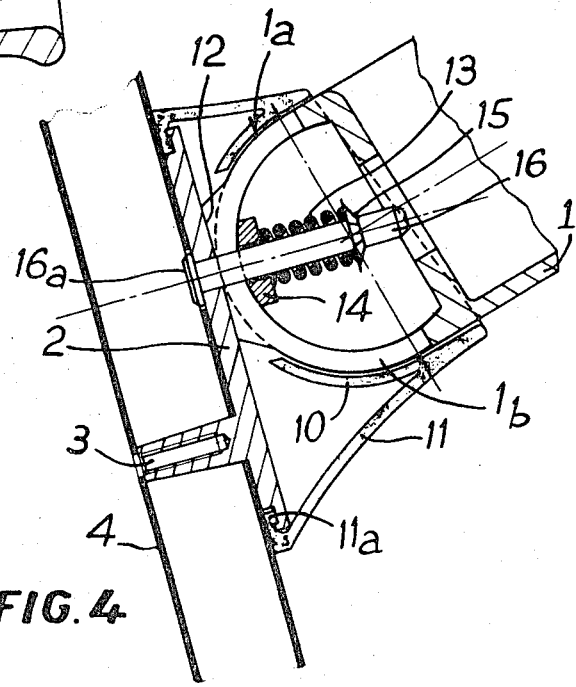
FIG. 3
FIG. 5
FIG. 4

CONTROL DEVICE FOR VEHICLE REARVIEW MIRROR

The invention relates to a control device for a vehicle rearview mirror.

The rearview mirrors which equip the less expensive types of vehicles, and which are adjustable from inside the vehicle are preferably those fitted on the vehicle door and known as gusset-fitting mirrors. This particular method is used for two reasons, one dictated by the designer who demands that the device be compact projecting as little as possible from the vehicle door; the other reason which is compatible with the first one, being safety. A device of this kind, for pivotally fitting a rearview mirror is already known from French Pat. No. 78 07493, but this device is used for pivotally mounting the stem of a rearview mirror on the bodywork of the vehicle.

To comply with the requirement whereby the lateral projection of the mirror should be reduced as much as possible, it is necessary for the vertical edge of the mirror situated on the vehicle door side, to be brought as close as possible thereto. To this end, it is necessary to use a hinged connection of the casing which will permit both to respect the norms laid down relatively to the retraction of the casing in the case of shocks, and to have a manual control of the mirror from inside the vehicle. Such control of the mirror needs to be simple, inexpensive and reliable.

According to the invention, the rearview mirror casing is mounted for pivoting on a support member integral with the bodywork of the vehicle, about a substantially vertical axis, the said support member comprising a pivoting bearing inside which a stem is mounted for sliding and rotating, one end of which stem is provided with an operating member, the other end being connected by means of a joint with two orthogonal axles of rotation, to an arm of the mirror support, the center of said joint being situated on the pivoting axis of the mirror when said mirror is in the neutral position and the said center of said joint being adapted to move in a horizontal plane according to a radius whose centre is situated on the pivoting axis of the mirror.

This arrangement of the pivoting connection of the casing permits a direct and simplified control of the mirror, due to the fact that the inside centre part of the casing is empty and free.

The invention will be more readily understood on reading the following description with reference to the accompanying drawings in which:

FIG. 1 is an elevational and longitudinal cross-section along line I—I of FIG. 2, of an embodiment of the rearview mirror control device according to the invention;

FIG. 1a is a detailed view of the swivel joint supporting the mirror;

FIG. 2 is a longitudinal cross-section of the device along II—II of FIG. 1;

FIG. 3 is a cross-sectional view of the device along III—III of FIG. 1;

FIG. 4 is a cross-sectional view of the flat bearing of the casing along IV—IV of FIG. 1;

FIG. 5 is a cross-sectional view of a male and female bearing of the casing along V—V of FIG. 1;

Figure 6:
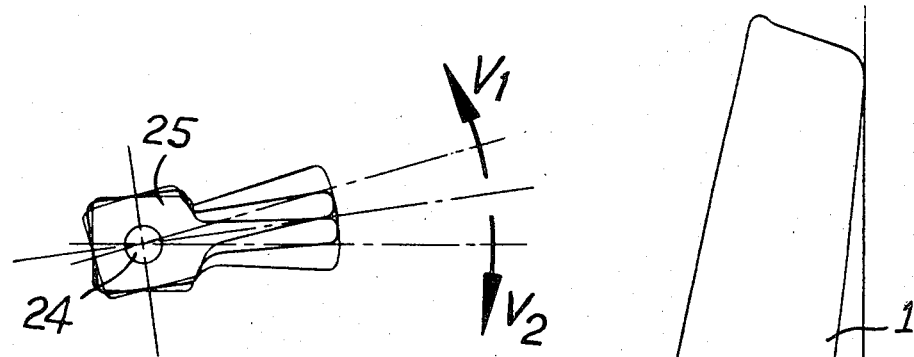
FIG. 6 is an end view of the operating member.

FIGS. 1, 2 and 3 show an embodiment of a rearview mirror control device according to the invention, which device comprises a casing 1 which is mounted for pivoting about an axis XXI on a support member 2 secured by means of a screw 3 on an element of a vehicle door or bodywork. On the base of the casing 1 is fixed a seat 5 for a spherical part 6 of a swivel joint comprising two guiding fingers 6a, 6b limiting the rotary movement of the mirror, the said swivel joint being mounted for pivoting in a corresponding female part 7 provided in the rear face of the support member 8 on which is fitted the mirror 9.

Thus it is possible for the mirror 9 to move about a vertical axis to affect a left-to-right displacement (FIG. 2) or about a horizontal axis to effect a face up-face down displacement (FIG. 3).

The casing 1 is mounted for pivoting about the axis XX1 and it is provided on one of its side edges with a semi-circular path 1a which is engaged in a corresponding recess 10 of a deformable protection member 11 made from a resilient material, whose edges 11a are gripped in position between the support member 2 and the vehicle door or bodywork element 4. The rounded part 1a of the casing is provided in its centre with two flat bearings 12, 12a which rest against the flat surface of the support member 2 (FIGS. 1,4) under the action of a spring 13 resting on one side, against the inner wall of the casing 1 via a washer 14, and on the other side against an elastic washer 15 locked in position on a stem 16 on which is engaged the spring 13. Said stem 16 traverses the walls of the casing 1 and of the support member 2 via holes provided in the said walls and it comprises a head 16a resting against the surface of the support member 2.

The rounded side edge 1a of the casing 1 is provided with two ribs 17, 17a of circular cross-section which are engaged in grooves 18, 18a of triangular cross-section provided in the support member 2.

Figure 8:
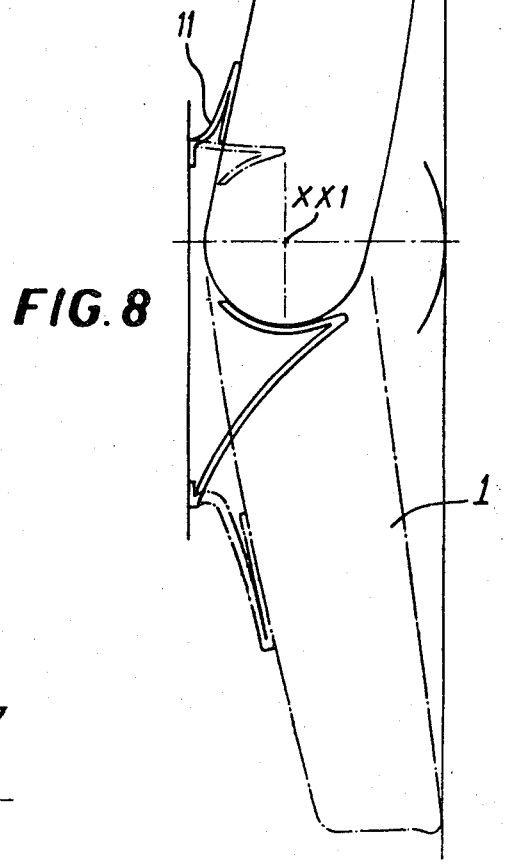
FIG. 8 is a plan view of the casing and of the deformable lining in an unclawed position of the device.

This arrangement permits to hold the casing 1 in the position of use illustrated in FIGS. 1, 2, 4 and 5 and the displacement of the casing 1 about the axis XX1 under the effect of a shock in an unclawed position as shown in FIG. 8, the two stems 16 having served to hold and guide the casing 1 in the groove 1b, of the semi-circular part 1a during its displacement.

The semi-circular part 1a of the casing 1 which is hollow is closed off at its ends by plugs 19, 19a.

In the central part of the support member 2 (FIGS. 1 and 2) there is provided a fork 20 in the branches of which is pivotally mounted a bearing 21 whose head 21a is in resting contact on one of the branches, the other end being held against the other branch by a fastening cupel 22. In the bearing 21 is provided a groove 23 inside which is rotatably and slidably mounted on operating handle 24 one end of which, extending inside the vehicle, is provided with an operating lever 25 (FIGS. 1, 2 and 6), whereas the other end extending inside the casing 1, is connected via a transmission joint with two orthogonal axles, to an arm 26 integral with the support 8 of the mirror.

In the body of the bearing 21, there is provided a housing 32 inside which is slidably mounted a braking member for the operating handle, which member is constituted by a lug 33 held against the operating handle 24 under the action of a spring 34 resting against the cupel 22.

Figure 7:
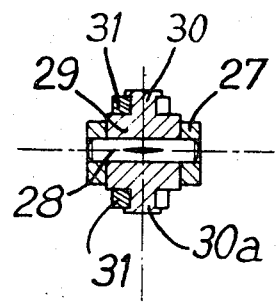
FIG. 7 is a cross-sectional view along VII—VII of FIG. 1.

As illustrated in FIGS. 1, 2 and 7, the handle 24 is extended by a fork 27 inside which is mounted a pin 28 on which pin is pivotally mounted a cross-shaped member 29 provided with two studs 30, 30a receiving the branches of the fork 31 provided at the end of the arm 26 integral with the mirror holder.

According to the invention, the centre of the hinged connection 27 to 31 is situated on the pivoting axis XX1 of the casing 1, when the mirror is in neutral position and said centre of the hinged connection is adapted to move in a horizontal plane according to a radius R whose centre is situated on the axis of the swivel joint 6 of the mirror 9.

The device according to the invention works as follows. To move the mirror 9 face up-face down, the lever 25 is actuated so as to pivot along the arrows V1 and V2 (FIGS. 1 and 6). As a result, the handle 24 and the transmission joint are rotated about the pin 28 so that the mirror support 8 and the mirror 9 are moved as shown in FIG. 3 according to positions A and B. To obtain a left-to-right and vice-versa movement of the mirror 9, the lever 25 is actuated and moved in the direction of arrows H1 and H2 (FIG. 2). As a result, the bearing 21 pivots so that the axis 30 of the transmission joint moves according to radius R carrying with it the mirror 9 in positions C and D such as illustrated in FIG. 2.

The invention is not limited to the description given hereinabove and, on the contrary, modifications can be brought thereto without departing from its scope or its spirit.

What is claimed is:

1. Control device for a vehicle rearview mirror in which a mirror support holding the mirror is hingedly mounted in a casing so as to pivot about two orthogonal axes and whose orientation is controlled from inside the vehicle by means of an operating handle with said mirror support having an arm cooperating with said operating handle, comprising
    a support member constructed integral with the bodywork of the vehicle, and supporting a pivoting bearing rotatable about a substantially vertical axis;
    said operating handle in the form of a stem mounted within said pivoting bearing for sliding and rotating in respect thereto, one end of which stem being provided with an operating member; and
    a joint connecting the other end of the operating handle stem to said arm of the mirror support and having two orthogonal axes of rotation, the center of said joint being situated on the pivoting axis of the mirror when said mirror is in a neutral position and said center of said joint being movable in a horizontal plane in an arc whose center is situated on the pivoting axis of the mirror.

2. The device of claim 1, wherein the casing rests, under the action of elastic means, by one of its side edges, against the support member, by means of two flat bearings and of two male and female bearings which ensure the positioning of the casing.

3. The device of claim 2, wherein the male bearings are constituted by ribs of semi-circular cross-section provided on one of the casing and the support member, which ribs are engaged in female bearings constituted by ribs of triangular cross-section provided on the other of the support member and the casing.

4. The device of claim 2, wherein at the locations of the flat bearings provided on the one side edge of the casing there are provided respective springs which each have an end resting against one washer reposed on an inner face of the casing, each spring being engaged on a stem traversing the walls of the casing and of the support member, with the stem including at one end thereof a head which is in resting contact with an inner face of the support member, and having another washer fixed at its other end engaging another end of said spring.

5. The device of claim 1, wherein the bearing, inside which the operating handle is mounted for pivoting and sliding, is mounted for pivoting in a fork integral with the support member and between the branches of which is placed the said operating handle.

6. The device of claim 5, wherein inside the body of the bearing there is provided a bearing housing inside which is slidably mounted a braking member for the operating handle, which braking member is constituted by a lug held against the operating handle under the action of a spring.

7. The device of claim 1, wherein the housing is provided with a side edge of semi-circular cross-section which is engaged in a corresponding housing of a deformable protection member of elastic material affixed to the support member.

8. The device of claim 4, wherein said casing has a portion of semi-circular cross section at said one side edge thereof, and openings are provided in the semi-circular portion of the casing to permit passage therethrough of the stems on which the springs are mounted.

* * * * *